United States Patent [19]

Philippe et al.

[11] 3,927,558

[45] Dec. 23, 1975

[54] DETERMINATION OF PROPERTIES OF METALS

[75] Inventors: Leon Jean Philippe; Rene Charles Defraye; Lucien Paul Renard, all of Liege, Belgium

[73] Assignee: Centre de Recherches Metallurgiques - Centrum voor Research in de Metallurgie, Brussels, Belgium

[22] Filed: Oct. 11, 1973

[21] Appl. No.: 405,435

[30] Foreign Application Priority Data

Oct. 11, 1972 Belgium .............................. 789963

[52] U.S. Cl. .................................................. 73/95
[51] Int. Cl.² ...................... G01N 3/08; G01N 3/28
[58] Field of Search ................... 73/95, 103, 89, 97; 33/147 D, 148 D

[56] References Cited
UNITED STATES PATENTS

| | | | |
|---|---|---|---|
| 2,562,749 | 7/1951 | Speer | 73/95 |
| 2,824,594 | 2/1958 | Gray | 73/97 |
| 3,554,019 | 1/1971 | Van Den Hove et al. | 73/89 |
| 3,733,049 | 5/1973 | Van Den Hove et al. | 235/151.3 |

Primary Examiner—James J. Gill
Assistant Examiner—Anthony V. Ciarlante
Attorney, Agent, or Firm—Holman & Stern

[57] ABSTRACT

A horizontal tensile testing machine is used in combination with a computer. Both ends of the specimen are moved simultaneously at the same speed in opposite directions. Elongation and changes in width are measured simultaneously by two independent extensometric systems having a common centre of symmetry which coincides with the centre of symmetry of the specimen throughout the test. The test sequence is performed by the machine without direct intervention of an operator.

19 Claims, 3 Drawing Figures

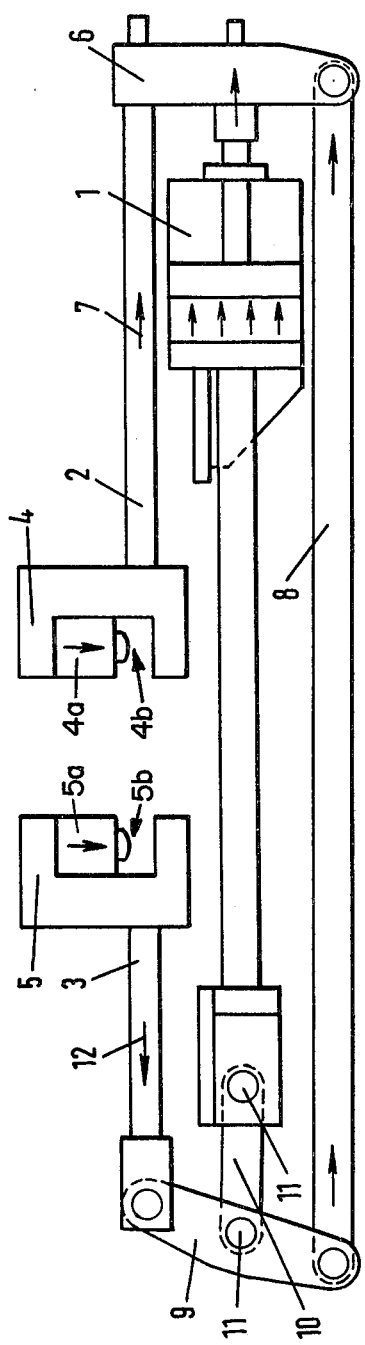
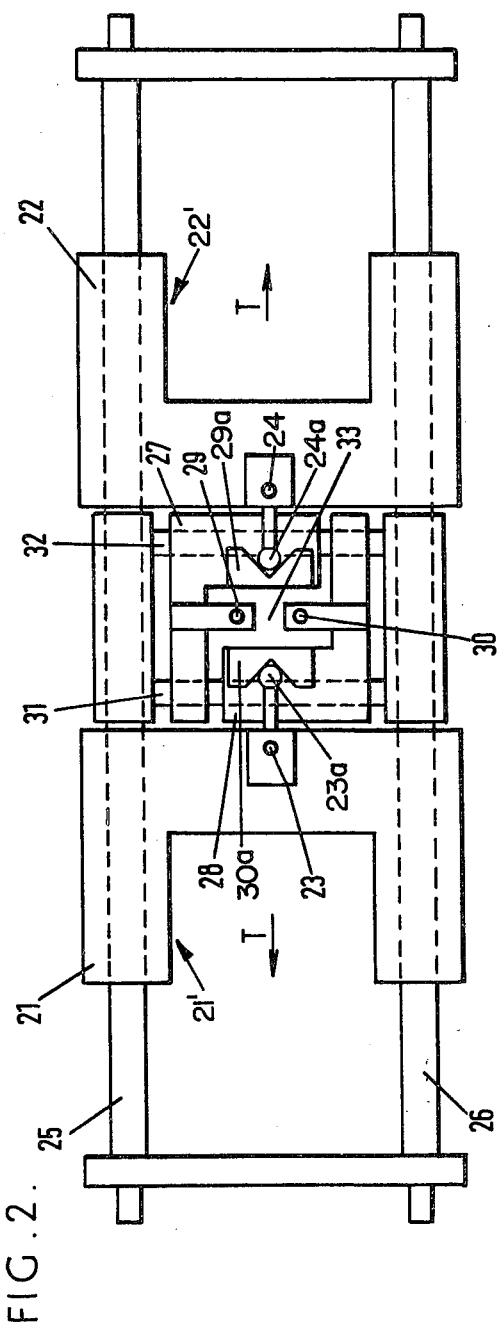
FIG. 1.
FIG. 2.

FIG. 3.

| Label | Symbol |
|---|---|
| Groups | ⊠ |
| Detectors | ⊠ |
| Energised | |
| Manual | ⊠ |
| Tighten clamps | ⊠ |
| Raise measuring apparatus | ⊠ |
| Low speed | ⊠ |
| High speed | ⊠ |
| Stop | ⊠ |
| Lower measuring apparatus | ⊠ |
| Release clamps | ⊠ |
| Return | ⊠ |
| Automatic | ⊠ |
| Start | ⊠ |
| Specimen in position | ☐ |
| Test in progress | ☐ |
| Scrutiny | ⊠ |
| Keyboard available | ☐ |
| Printer failure | ⊙ |
| Printer operative | ⊠ |

Legend:
- ⊠ Push button
- ☐ Indicator bulb
- ⊙ Flashing indicator

DETERMINATION OF PROPERTIES OF METALS

FIELD OF THE INVENTION

The present invention relates to a process and a device for determining properties of metals by means of a tensile testing machine.

BACKGROUND OF THE INVENTION

The need to gain ever more extensive knowledge of the substances employed in mass production entails the development of ever more advanced devices to allow a valid prediction of the behaviour of these substances on production lines. This applies in the case of sheet metal intended for coachwork, for which it is desirable to ascertain particular drawability parameters from an increasing number of samples.

To this end, the use of tensile testing machine equipped with a computer has already been recommended, and it has proved possible to determine the following characteristics quickly and continuously;

1. the proof stress conventional yield stress for an elongation varying from 0.01 to 0.2 percent
2. the upper and lower yield stress
3. the yield point elongation
4. the normal anisotropy coefficient of plastic deformation, denoted by the letter $r$,
5. the strain hardening modulus, denoted by the letter $n$,
6. the rational elongation corresponding to maximum load, and
7. the ultimate tensile strength. (see for example U.S. Pat. Nos. 3554 019 and 3733 049).

All or some of these characteristics are evidently determined, depending on the kind of metal; for example, it is known that rimming steel has a yield stress range whereas killed does not.

The value of these different characteristics is derived from the analysis, by the computer, of signals representing the elongation of the gauge length and the variation of the width of the gauge width of the specimen and symbols representing the tractive force imposed on the specimen. The results obtained in this manner are already very satisfactory, since the computer renders it possible to process the numerous data with the rapidity necessitated by the requirements of production control.

Nevertheless, it is noted that tensile testing machines such as are still in common use at present, have the disadvantage that they are not automatic, since their operation requires adjustments to be performed by the operator from the placing in position of the specimen in the machine until the breaking of the specimen.

The present invention is based on the following considerations.

1. The application of the tensile stress on the specimen by means of a stationary clamp and a displaceable clamp, as in the prior art, has the result that the displacements of the different points of the specimen are variable with respect to the framework of the machine taken as a reference. This system should thus be modified to enable automation of the loading operation.
2. The extensometric system commonly has a centre of symmetry whose displacement during testing may introduce an error not only in the measurement of the variation of the length of the gauge length, but also in the measurement of the variation of its width. A possibility of incurring an error of this kind should be reduced to a minimum so that the width and length measurements may be automatic.
3. The orders producing automaticity of the operation of the tensile testing machine should be integrated in the program of the computer used in combination with the tensile machine, so that control may be exercised with or without the intervention of the computer.

SUMMARY OF THE INVENTION

In the process of the present invention, wherein use is made of a traction machine of the horizontal type, equipped with pickups or detectors measuring the load and variations in the length and width of the basis of measurement of the specimen exposed to tensile testing, in combination with a calculator or computer for rapid and possibly continuous processing of the data, an identical tractive stress is applied at both extremities of the specimen by means of two clamps being displaced simultaneously at identical speed and in opposite directions, the variation in length and the variation in width of the measurement base are measured at the same time by means of two extensometric systems, the mobility of each of which is totally unaffected by that of the other, the centre of symmetry of these two systems being shared by them and constantly coincident with the centre of symmetry of the specimen on which it has been centered upon placing these two systems in contact with the specimen, until the end of the test, and the sequence of the different stages of the tensile test is performed solely by remote control, without any direct intervention of the operative on the machanisms of the traction machine, except for placing the specimen in abutment between the clamps at the beginning of the operation and for its removal after breaking.

When the specimen has been placed in abutment between the clamps, the first stage of the remotely controlled sequence consists of locking the specimen in the clamps under a pressure which is predetermined and exercised by means of a hydraulic assembly, which renders it possible to prevent any accidental displacement upon application of the tensile stress.

It has proved to be advantageous to apply to the specimen thus locked a relatively small tensional force such as to avoid any elongation but sufficient to place the specimen under tension and correct any lack of planeity of the surface of the specimen intended to come into contact with the extensometric systems. This represents the second stage of remotely controlled sequence.

After the specimen has been placed under tension, the third stage of the remotely controlled sequence consists in placing the extensometric systems corresponding to the length and width of the measurement base in contact with the lower surface of the specimen by means of a thrust exercised upwards from below on the said extensometric systems.

When the extensometric systems are in position and ready for action, the fourth stage of the sequence, remotely controlled, consists in applying the tensile stress at a predetermined speed and in maintaining this speed until the yield point or the end of the yield point elongation is reached, the speed being referred to as loading speed, and then to increase this speed to a higher value selected to complete the test and referred to as elongation speed.

Finally, the last stage of the sequence, remotely controlled, consists in maintaining the traction speed equal to the value selected for the elongation speed up to maximum load.

Upon locking the specimen in the clamps under pressure, the correct and final placing in position of this specimen is advantageously assisted by the displacement of a ball comprising a spherical surface which is installed within each clamp and intended to establish tight contact with the upper surface of the specimen.

In a particularly advantageous embodiment of the invention, the displacement of the two extensometric systems for the purpose either of placing these in contact with the specimen at the beginning of the test or of their separation at the end of the test, is performed on each occasion in a single operation by the appropriate displacement of a support common to both the aforesaid systems whose centering is thus assured automatically.

In another particularly advantageous embodiment of the invention, the contact between the extensometric systems and the lower surface of the specimen is established by pricking the points with which the extensometric markers are equipped, into the metal forming the said surface.

During the zero reset of the extensometric systems after the specimen has broken, the correct spacing between the pairs of points of each system, as well as the coincidence of the centres of symmetry of the two systems, are established by placing a spherical stop which is integral with one system, in contact with the inner sides of a dihedron integral with the other system.

The remote control over the sequence of the different stages of the tensile test may be exercised manually, for example, by action of the operative on push-buttons, or automatically by positive linkage to the computer which then takes over the automatic functions as well as the calculating functions.

Tensile testing apparatus according to the present invention comprises a horizontal traction machine equipped in particular with detectors for measurement of the load and of the variations in length and width, and a computer linked to the detectors, and includes:
  a. a mechanism for application of an identical tractive force to both extremities of the specimen, comprising two clamps which may be displaced simultaneously at the same speed and in opposite directions,
  b. an array for measuring the variations in length and width, comprising two extensometric systems arranged to be displaceable independently of each other whilst keeping their common centre of symmetry substantially stationary throughout the test period;
  c. a remote control desk for the different mechanisms with which the traction machine is equipped.

The invention will be described further, by way of example only, with reference to the accompanying drawings, in which:

FIG. 1 is a diagrammatic side elevation of part of a tensile testing machine;

FIG. 2 is a diagrammatic plan view of the measuring device of the machine; and

FIG. 3 is a diagram of the control device of the machine.

DESCRIPTION OF A PREFERRED EMBODIMENT

The mechanism, illustrated in FIG. 1, for applying tension to the specimen comprises a piston and cylinder device 1 for load application and two guided spindles 2 and 3 rigid with corresponding clamps 4 and 5 for clamping the ends of the specimen. The spindle 2 is linked to the piston 1 by an arm 6, so that the displacement of the spindle 2 occurs in the same direction as that of the piston rod of the device 1, that is to say in the direction of the arrow 7. The spindle 3 is connected to the piston by means of a jointed linkage reversing the direction of the force and comprising a connecting rod 8, a lever 9, and a link 10 pivotable around points 11 at each end, so that the displacement of the spindle 3 occurs in the direction of the arrow 12 which is contrary to that of the arrow 7, with an amplitude equal to that of the displacement of the spindle 2. Thus both ends of the specimen will be displaced simultaneously at the same speed but in opposite directions so that the specimen's center of symetry (its mid-point, which is between clamps 4,5) will remain stationary.

The arrangement for measuring length and width variations (FIG. 2) comprises two extensometers. A length extensometer comprises two carriages 21 and 22 carrying respective sensors in the form of pointed marking pins 23 and 24, the carriages 21,22, being displaceable parallel to the axis of traction (T—T) on two rolling tracks 25 and 26. Two carriages 27 and 28 bearing respective sensors in the form of marking pins 29 and 30, the carriages 27,28 being displaceable at right angles to the axis of traction on two rolling tracks 31 and 32. The centres of symmetry of the two extensometers (the mid-points between the pins 23 and 24 and between the pins 29 and 30) coincide at 33.

The arrangement shown in FIG. 2 is positioned below the specimen between the clamps 4,5 which are received within recesses 21,22 in the respective carriages 21 and 22. The common center of symmetry (33) is midway between the clamps.

After a test, the extensometers have to be reset to their initial (zero) position. The correct spacing between the pairs of pins 23,24 and 29,30, as well as the coincidence of the centres of symmetry of the two extensometers, is established by placing a pair of spherical stops 23a,24a (rigid with the other pair of pins 29,30).

The desk for remote control of the various mechanisms with which the tensile testing machine is equipped comprises two separate arrangements, one offering manual control and the other automatic control by the computer. The computer employed may be of the analog type or preferably of the digital type.

FIG. 3 illustrates a form of embodiment of the control desk of a tensile testing machine in combination with a computer. The tensile testing machine is of the horizontal type and has a load capacity of 2.5 t. The tractive force is generated by means of a hydraulic pump coupled with the piston and cylinder device 1 FIG.1); a stress detector which transmits a signal proportional to the stress is inserted in the hydraulic power circuit. Force is applied to the specimen through hydraulically applied pins 42,52 of the clamps 4,5 only part of the jaws 4a,5a is shown in FIG. 1; they respectively have spherical bearing surfaces 4b,5b allowing their working faces (not illustrated) to align with and establish tight contact with the upper surface of the specimen. At the beginning of the test, pointers pins 23,24 and 29,30 are set on or applied to the specimen by raising the common support constituted by the tracks 25,26; the width measurement base (guage width) is 18 mm, that for length (guage length) being 80 mm.

Push-buttons enable use to be made of the machine without resorting to the computer. A pen recorder should be put into operation in this case, to allow calculation of the various parameters required from the traces recorded.

In automatic operation, when testing a steel specimen, for example, the operator records the initial dimensional features of the specimen (e.g. thickness and width) by means of a keyboard. Thereupon, he places the ends of the specimen between the clamps and actuates the "start" knob. The computer thereupon controls the sequence of operations, performs the measurements and calculations required, and prints the results in the typewriter. The sole remaining duty of the operative is to operate the control for return of the clamps after removal of the pieces of the specimen.

As soon as the operative has activated the "start" knob, the computer verifies the presence of the specimen and then applies the clamp jaws 4a,5a. After this, it applies, the stress and scans the stress detector periodically. When a tension of 5 kg/mm² is reached the computor raises the arrangements of extensometers (FIG. 2) until the pins 23,24 and 29,30 penetrate the specimen, and, beginning with 6 kg/mm², scans the elongation of the specimen periodically.

The computer lacks data on the grade of steel of the specimen, so that immediately upon starting the stress and elongation scanning operations, the computer seeks to determine the yield stress. It will, in any event, determine a proof stress for example at 0.2 percent of elongation, will finally ascertain in any event; nevertheless, if two consecutive stress values are lower than a preceding value during the change in stress, the computer assumes the highest value as defining the upper yield point; thereafter, the computer seeks a subsequent possible minimum stress which will be considered as defining the lower yield point.

The computer continues to search for the yield stres up to an elongation of 10 percent.

The determination of the termination of the yield point elongation is based on the first derivative of the stress with respect to elongation (theoretically this derivative is zero throughout the yield elongation); the yield elongation is considered at its end when the derivative reaches a particular positive value.

The different searches defined above are performed at slow traction speed (5 mm/minute); when the tension has reached a definite value, for example equal to 2.4 kg/mm² above the yield stress (or above the stress) at 0.2 percent of elongation, the computer shifts the machine into high speed traction (e.g., 25 mm/minute).

At elongations of 12, 15, and 18 percent, the three tensions are stored in a memory unit for the purpose of calculating the plastic strain ratio $r$ and the strain hardening modulus $n$. The factor $r$ is calculated at 18 percent. Values of the modulus $n$ are calculated between the 12 and 15 percent points, between the 15 and 18 percent points, and between the 12 and 18 percent points, and the mean of the values thus obtained is taken as the modulus.

At the same time, the computer seeks the maximum load (i.e., the tensile strength) and it thereupon seeks the elongation at fracture, which is defined as the elongation which is reached when the derivative of elongation with respect to time becomes equal to 2 mm/second.

Finally, when the load (after reaching a maximum) follows the value of 0.2 kg/mm², the measuring operations are stopped and the measuring equipment is restored to the idle position to prevent damage during fracture of the specimen; the calculated results are then printed out. The sole remaining duty of the operative is to withdraw the pieces of specimen and to return the clamps to the initial position.

Provision has been made for a definite number of messages to apprise the operative of particular anomalies: phasing error in the data infeed, drift of the supply to the detectors, of their amplitudes, etc.

The operative also has at his disposal a "manual" push-button enabling him to trigger the measurement and printing of the three main data (length, width, force) when he wishes to perform a calibrating operation on the machine.

A warning bulb informs the operative that the printer has broken down (e.g., for lack of current supply or paper); a push-button renders it possible to place this printer in operation again after being put right.

We claim:

1. A process for determining mechanical properties of a metal in the form of a flat tensile test specimen, using a tensile testing machine of the horizontal type, having detectors for measuring the load and variations in length and width of a flat measurement base of the specimen, in combination with a computer for processing of the measurement data, the process comprising the steps of: applying an identical tensile stress simultaneously from both ends of the specimen by means of two clamps engaged at opposite ends of the specimen and displacing them simultaneously at the same speed in opposite directions; and simultaneously measuring both the change in length and the change in width of the measurement base simultaneously by means of two extensometric systems which are movable independently of each other, locating and maintaining the center of symmetry of these two systems so that they are the same and are continuously coincident, until the end of the test, with the center of symmetry of the specimen and on which the specimen is centered upon placing these two systems in contact with the specimen, whereby the tensile test sequence is performed by the tensile testing machine without direct intervention of an operator, except for placing the specimen in the clamps at the beginning of the test and for withdrawing the specimen after fracture.

2. A process as claimed in claim 1, in which, after the specimen has been placed in between the clamps, the initial stage of the test sequence comprises clamping the specimen in the clamps under a predetermined hydraulically applied pressure to prevent accidental displacement during application of the tensile stresses.

3. A process as claimed in claim 1, comprising applying a small tractive force to the specimen after clamping, without causing elongation and so that the force is sufficient to place the specimen under tension to correct the planeity of the surface of the specimen which is measured by the extensometric systems.

4. A process as claimed in claim 1, in which, after the specimen has been placed under tension, applying the extensometric systems in contact with a lower surface of the specimen by means of a thrust exerted upwards from below on the extensometric systems.

5. A process as claimed in claim 1, in which, when the extensometric systems are in position and ready for operation, applying traction to the specimen at a predetermined speed and maintaining this speed until the yield stress or the end of the yield point elongation of the specimen has been reached.

6. A process as claimed in claim 1, including increasing the speed of traction of the claims from a predetermined value maintained until the yield stress or the end of the yield elongation is reached.

7. A process as claimed in claim 1, in which the final stage of the test sequence consists of maintaining the traction speed equal to a predetermined value up to a maximum load.

8. A process as claimed in claim 1, in which, whilst clamping the specimen in the clamps, effecting the correct and decisive placing in position of the specimen by the displacement yield point a ball having a spherical surface situated in each clamp to establish tight contact with the upper surface of the specimen.

9. A process as claimed in claim 1, including effecting displacement of the two extensometric systems for the purpose of being placed in contact with the specimen at the beginning of the test or of their separation at the end of the test is performed on each occasion as a single operation by the displacement of a support common to the two systems.

10. A process as claimed in claim 1, including establishing contact of the extensometric system with the lower surface of the specimen by pressing pins, comprising a portion of the extensometric systems, by urging the pins into the surface of the specimen.

11. A process as claimed in claim 1, in which, during resetting of the extensometric systms, after fracture of the specimen, the correct spacing between the pairs of reference points of each system as well as the coincidence of the centers of symmetry of the two systems is established by the placing a spherical stop integral with one system in contact with the inner surface of a dihedron integral with the other system.

12. A process as claimed in claim 1, including providing an automatic control for the sequence of the stages of the tensile test and including a manual over-ride for the automatic control.

13. A process as claimed in claim 1, including effecting automatic control of the stages of the tensile test automatically by positive linkage to the computer.

14. Apparatus for determining mechanical properties of a metal in the form of a flat tensile test specimen, the apparatus comprising a horizontal tensile testing machine having detectors for measuring the load and the changes in length and width of a measuring base of the specimen, and a computer linked with the detectors, and including in combination:
   a. a mechanism for application of an identical tractive stress at both ends of the specimen, comprising two clamps displaceable at the same time at the same speed and in opposite directions;
   b. means for measuring changes in length and width of the flat specimen comprising two extensometric systems each of which being displaceable independently of each other and each including a common center of symmetry substantially stationary throughout the test period; and
   c. means for controlling the mechanisms with which the traction machine is equipped.

15. Apparatus as claimed in claim 14, in which the mechanism for applying an identical tractive force at both ends of the specimen comprises a piston and cylinder device for load application and two guided spindles rigid with the corresponding clamps, one spindle being coupled to the piston including means so that displacement of the spindle occurs in the same direction as that of the piston, the other spindle being connected to the device by means so that the displacement of the spindle occurs in the opposite direction and with an amplitude equal to that of the displacement of the said one spindle.

16. Apparatus as claimed in claim 14, in which the means for measuring the changes in length and width comprises a twin extensometric system consisting on the one hand of two carriages bearing marking points integral with a length measuring detector, these two carriages being displaceable parallel to the axis of traction, aand two carriages bearing marking points integral with a width measuring detector, these two carriages being displaceable at right angles to the axis of traction, the centers of symmetry of the two systems coinciding on the axis of traction.

17. Apparatus as claimed in claim 14, in which the means for controlling the mechanisms with which the traction machine is equipped comprises two separate arrangements one of which providing manual control and the other of which providing automatic control by the computer.

18. Apparatus as claimed in claim 14, in which the computer is of the analog type.

19. Apparatus as claimed in claim 14, in which the computer is of the digital type.

* * * * *